United States Patent [19]

Greisman

[11] 4,019,949
[45] Apr. 26, 1977

[54] HEAT SEALING APPARATUS

[75] Inventor: Samuel Greisman, London, England

[73] Assignees: The Thames Sack and Bag Company Limited; London, England

[22] Filed: Mar. 11, 1975

[21] Appl. No.: 557,327

[30] Foreign Application Priority Data

Mar. 12, 1974 United Kingdom ............ 11059/74

[52] U.S. Cl. ............................... 156/582; 100/171
[51] Int. Cl.² ..................... B32B 31/00; B30B 3/04
[58] Field of Search ........... 156/582, 3; 100/93 RP, 100/171, 176

[56] References Cited

UNITED STATES PATENTS

| 1,296,112 | 3/1919 | Peiler | 100/93 RP |
|---|---|---|---|
| 2,385,583 | 9/1945 | McLauchlan | 156/582 |
| 2,680,470 | 6/1954 | Stanton | 156/582 |
| 2,818,904 | 1/1958 | Ambrose | 156/582 |
| 3,138,695 | 6/1964 | Bracich | 156/582 |
| 3,218,218 | 11/1965 | Bratt et al. | 156/582 |
| 3,218,961 | 11/1965 | Kraft et al. | 100/93 RP |
| 3,531,361 | 9/1970 | Grandinetti | 156/582 |
| 3,623,933 | 11/1971 | Staats | 100/93 RP |

*Primary Examiner*—Douglas J. Drummond
*Attorney, Agent, or Firm*—Brady, O'Boyle & Gates

[57] ABSTRACT

A heat sealing apparatus for sealing together two layers of heat softenable plastics material, for example two sides of the top of a bag or sack, comprising a pair of rollers arranged to nip said layers together to form a seal after they have been softened, means loading one roller towards the other roller and permitting said one roller to be urged away from said other roller against the load exerted by said loading means on passage of layers of plastics material between the rollers, and stop means arranged such that said loading means exerts a reduced loading on the rollers in the absence of layers of plastics material to be sealed.

4 Claims, 2 Drawing Figures

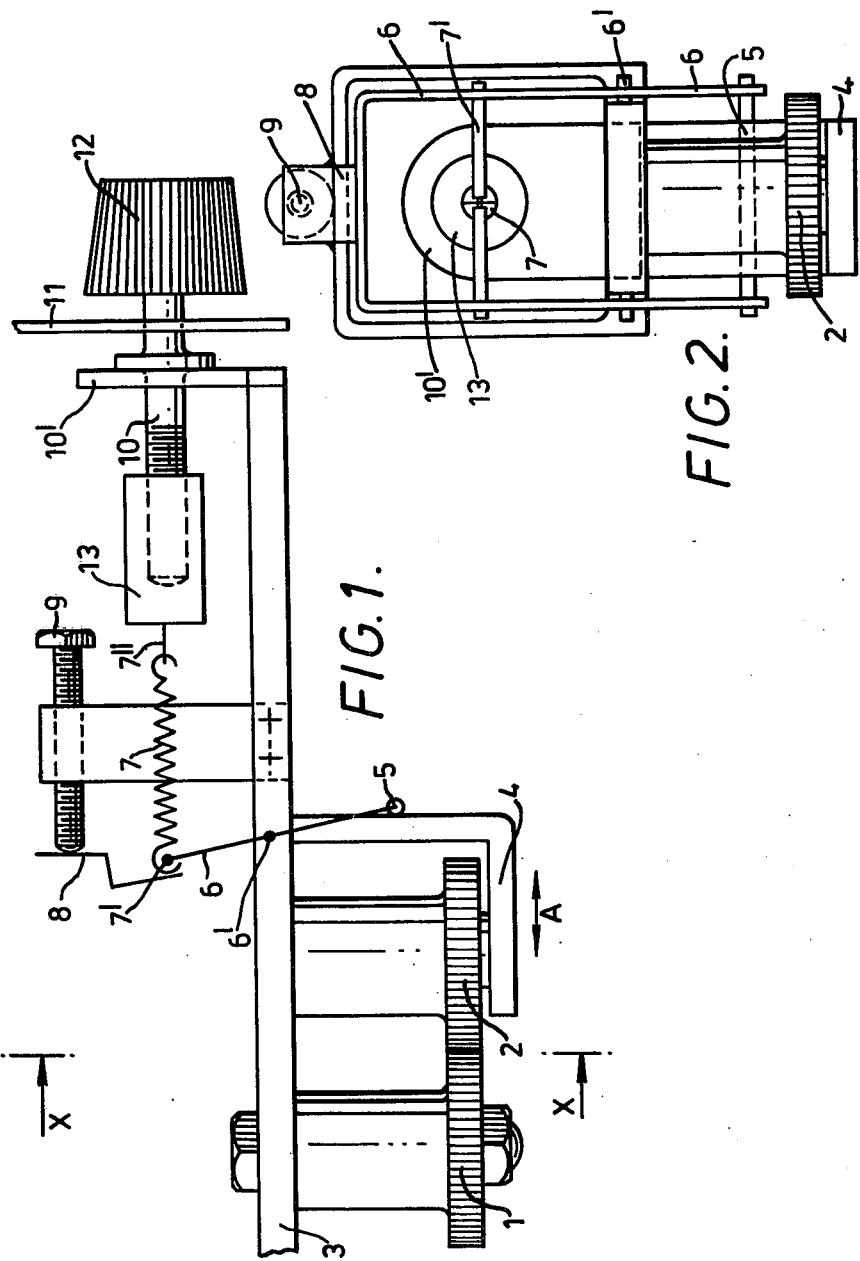

HEAT SEALING APPARATUS

This invention relates to a heat sealing apparatus for sealing together two layers of heat softenable plastics material, for example, the sides of the top of a bag or sack, and is applicable both to hot air heat sealing apparatus and to other types of heat sealing apparatus.

In a conventional method of sealing together two layers of heat softenable plastics material, the layers are first heated to an extent sufficient to soften them, and then, while still soft, they are passed between a pair of rollers which nip the layers together and thereby weld them together to produce a seal.

It will be apprecated that the seal is produced by a combination of heat and pressure, and that heat without pressure or pressure without heat will not be satisfactory. In general, however, provided the plastics material has been sufficiently softened by heating, the higher the pressure, the better the seal produced, within reasonable limits. This is particularly true where the bags contain a powdery material which may contaminate the layers to be sealed by adhering thereto, for example as a consequence of electrostatic attraction. Where contamination occurs, a high pressure is usually necessary to produce a good seal. However, if the rollers are constantly urged towards one another to give a high pressure nip, there is greatly increased wear on the motor driving the rollers, and on the bearings employed, and this disadvantage has hitherto generally been considered so serious as to inhibit the use of high pressures.

It is an object of the invention to provide a heat sealing apparatus for sealing together two layers of heat softenable plastics material in which high sealing pressures can be achieved without excessive wear.

According to the invention, there is provided a heat sealing apparatus for sealing together two layers of heat softenable plastics material, for example two sides of the top of a bag or sack, comprising a pair of rollers arranged to nip said layers together to form a seal after they have been softened, means loading one roller towards the other roller and permitting said one roller to be urged away from said other roller against the load exerted by said loading means on passage of layers of plastics material between the rollers, and stop means arranged such that said loading means does not exert full loading on the rollers in the absence of layers of plastics material to be sealed.

Advantageously, the loading means is a spring loading means, in which case the spring loading means advantageously comprises a lever and a spring arranged to urge the lever to bear at one end thereof against the stop means, and at the other end thereof against a member on which said one roller is mounted, thereby to urge said one member and the roller mounted thereon towards said other roller.

Advantageously, the loading means is adjustable to vary the strength of the loading. Then, for example, a relatively high pressure can be used where contamination is likely or in other cases where it is difficult to make a seal, and a relatively low pressure in other cases. Adjustment is advantageously achieved in the case of spring loading by means of a screw-operated plunger to which the spring acting on said lever is attached. Rotation of the screw then increases or decreases the tension in the spring.

Advantageously, the positon of the stop means is adjustable for varying the loading on the rollers in the absence of said layers of plastics material to be sealed. Then, for example, the force required for the layers initially to penetrate between the rollers can be varied to suit the particular layers being sealed. The stop means may, for example, be a screw-adjuster.

It will be appreciated that since the rollers of the present heat sealing apparatus are urged against one another to produce a high pressure nip only when there are layers between the rollers, and not in intervals between passage of layers through the apparatus, wear is substantially reduced.

In order to enable the invention to be more readily understood, reference will now be made to the accompanying drawings, which illustrate diagrammatically and by way of example an embodiment thereof and in which:

FIG. 1 is a side elevation of a part of a heat sealing apparatus for sealing together two layers of heat softenable plastics material, and FIG. 2 is a view on the line X—X of FIG. 1.

Referring to the drawings, the heat sealing apparatus comprises means (not shown) for heating layers of plastics material to soften them, and a pair of rollers 1, 2 for sealing the just softened layers together. The roller 1 is fixedly mounted in the apparatus, and the roller 2 is mounted on a support 4 which is movable radially relative to the roller 1, in the direction shown by the double-headed arrow A in FIG. 1. A cross-bar 5 spanning the limbs of a U-shaped lever generally indicated as 6 bears against the support 4, and is arranged to urge the support 4, and with it the roller 2 mounted thereon, towards the roller 1, by means of a spring 7. The lever 6 is pivoted on a bedplate 3 by means of a cross-bar 6' extending through a complementary aperture in the bedplate. The end of the lever 6 remote from the cross-bar 5 has affixed to it an angled projection 8 which is arranged to bear against a screw adjuster 9, which constitutes a stop limiting the movement of the lever 6 under the influence of the spring 7. The screw adjuster 9 is mounted in a bracket 9' secured to the bedplate 3 and is adjusted such that when the projection 8 abuts it, the cross-bar at the remote end of the lever urges the support 4 into light contact with the roller 1, but without the full force of the spring 7. One end of the spring 7 is secured on a cross-bar 7' between the limbs of the lever 6. The other end of the spring 7 is engaged in an aperture 7'' in a plunger of a spring tensioner generally indicated as 10 which is secured to the frame of the heat sealing machine by means of a bracket 10'. The tensioner 10 extends through an external casing 11 of the apparatus, and terminates in an adjustment nob 12, on rotation of which the plunger 13 is caused to move longitudinally into or out of the tensioner 10, and thereby to increase or decrease the tension in the spring 7.

In use of the apparatus, the rollers 1 and 2 are lightly touching as previously stated, high pressure contact of these rollers under the influence of the spring being prevented by the projection 8 on the lever 6 bearing against the screw adjuster 9, and thus limiting the extent of movement of the cross-bar 5 and the support 4. In the absence of layers to be sealed, there is little load on the motor or the bearings, and so wear is slight. When layers to be sealed pass between the rollers 1 and 2, the roller 2 is urged away from the roller 1 to cause the lever 6 to pivot anti-clockwise against the resistance of the spring 7. Consequently, the projection 8 no longer abuts the stop 7 and the full tension of the spring 7 is transmitted through the lever 6 to produce a high pressure nip between the rollers 1 and 2 to effect sealing, i.e. a pressure much higher than is present in the absence of layers to be sealed. Once the layers have passed through the rollers, the spring 7 urges the support 4 and roller 2 back towards the roller 1, but is prevented from urging them strongly against one another by reason of the projection 8 bearing on the screw adjuster 9. The exact positon at which the rotation of the lever is stopped can be varied by adjusting the screw adjuster 9.

For the sake of clarity, the lever 6 has been shown in FIG. 1 merely as a straight line, but it will be appreciated that in fact its width is sufficient for the cross-bars 5, 6' and 7' to be accommodated in apertures in the limbs of the lever.

I claim:

1. A heat sealing apparatus for sealing together two layers of heat softenable plastics material, for example two sides of the top of a bag or sack, comprising a frame, a first roller mounted on the frame for rotation about a fixed axis, a carrier slidably mounted on the frame for rectilinear movement perpendicular to said fixed axis, a second roller mounted on said carrier for rotation about an axis parallel to said fixed axis, spring loading means acting on said carrier to urge said second roller towards said first roller, stop means inhibiting the loading of the spring loading means on the carrier in the absence of layers of plastics material between the rollers, said spring loading means comprising a lever and a spring arranged to urge the lever to bear at one end thereof against the stop means, and at the other end thereof against said carrier, thereby to urge said carrier and the second roller mounted thereon towards said first roller.

2. A heat sealing apparatus according to claim 1, wherein the loading means is adjustable to vary the strength of the loading.

3. A heat sealing apparatus according to claim 2, wherein adjustment is achieved by means of a screw-operated plunger.

4. A heat sealing apparatus according to claim 1, wherein the position of the stop means is adjustable for varying the loading on the rollers in the absence of said layers of plastics material to be sealed.

* * * * *